United States Patent [19]

Gloviak

[11] Patent Number: 4,496,030

[45] Date of Patent: Jan. 29, 1985

[54] AUTOMATIC LUBRICATION ASSEMBLY

[75] Inventor: John A. Gloviak, Chicago, Ill.

[73] Assignee: Stewart-Warner Corporation, Chicago, Ill.

[21] Appl. No.: 473,072

[22] Filed: Mar. 7, 1983

[51] Int. Cl.³ .............................................. F16N 11/04
[52] U.S. Cl. .................................. 184/45 R; 184/88 R
[58] Field of Search ..................... 184/45 R, 45 A, 41, 184/39, 88 R; 215/222, 223

[56] References Cited

U.S. PATENT DOCUMENTS

| | | | |
|---|---|---|---|
| 1,234,307 | 7/1917 | Donges | 184/45 R |
| 1,540,978 | 6/1925 | Barthel | 184/45 R X |
| 1,644,343 | 10/1927 | MacIndoe | 184/45 R |
| 1,729,960 | 10/1929 | Murphy | 184/45 R X |
| 1,784,573 | 12/1930 | Butler et al. | 184/45 R |
| 1,989,451 | 1/1935 | Hull | 184/45 R |
| 2,857,020 | 10/1958 | Otto | 184/45 R |
| 4,018,305 | 4/1977 | Tietje | 184/45 R |
| 4,091,948 | 5/1978 | Northup | 215/222 |
| 4,399,920 | 8/1983 | Swartzbaugh et al. | 215/222 X |

Primary Examiner—David H. Brown
Attorney, Agent, or Firm—Augustus G. Douvas

[57] ABSTRACT

An automatic lubrication assembly that dispenses grease under pressure to machinery which requires frequent lubrication, including a spring biased one-piece rigid plastic molded plunger that has a flexible thin walled sealing lip eliminating the requirement for any seals, slidable in an open ended plastic grease cup covered by a removable cap that permits the biasing spring to be easily changed. The grease cup is formed integrally with a plastic base that has a metal outlet fitting insert molded therein that extends into the cup a substantial distance beyond a transverely positioned inlet fitting in the base to absorb side loads on the plastic cup and base.

18 Claims, 11 Drawing Figures

AUTOMATIC LUBRICATION ASSEMBLY

BACKGROUND OF THE PRESENT INVENTION

Automatic lubricators of the type having continuously spring biased pistons or plungers have been manufactured and in use for the past half century and originally included a cast metal base having a central axially extending outlet opening through a threaded fitting and a transverse inlet fitting or nipple. A metal grease cup was threaded to this base and formed a reservoir for lubricant entering through the inlet fitting in the base, and a spring biased piston with annular O-ring seals was slidable in the metal cup and biased in a direction to slowly force lubricant from the base through the outlet under the continuous biasing force of a coil compression spring seated in the rear of the cup. These automatic lubricators have found a significant degree of success in lubricating machinery that requires daily or even more frequent lubrication. Since the reservoir holds several cubic inches of lubricant, the maintenance operator fills the reservoirs much less frequently than would otherwise be required to directly lubricate a high demand machine.

Through the years, several successful modifications have been made to this basic automatic lubricator. One such improvement includes a tapered orifice in the base adjacent to the outlet that attempted to achieve the objective of continuous flow from the lubricator as the piston moves forwardly in the cup. Since the spring force decreases as the piston moves forwardly, it had been though that tapering the orifice to increase the area of the orifice as the piston moves forwardly would provide continuous lubrication flow, although some tests have indicated doubt as to whether this in fact takes place in these tapered orifice designs. Another modification in these early automatic lubricators or "automatic grease cups" as they are sometimes referred to, is the provision of an overflow orifice in the cup near its rear end that communicates with the lubricant side of the plunger as the plunger reaches its extreme rear position, to permit lubricant to escape from the cup and thereby minimize the possibility of overfilling and grease cup rupture.

While such vent or overflow holes are effective, they do require additional machining operations in the side of the cup and thereby increase the cost of the overall assembly.

Still another improvement in the original automatic lubricator design, proposed during the last decade, is the provision of a clear plastic reservoir or cup so that the operator can not only visually see when the lubricator is empty, but also can have an idea of when the lubricator is filled during the filling operation by viewing the position of the plunger in the cup.

One disadvantage of these clear plastic grease cups is that because they are constructed of plastic and have closed end grease cups, a core piece is required in the molding operation that must be removed, and hence the inside of the cup must be tapered somewhat for core removal. Since the open end of the cup is usually threaded to the base in these designs, the diameter of the cup increases as the plunger moves forwardly therein, creating the possibility of leakage as the plunger approaches a forward position where spring pressure is low and plunger leakage problem is the greatest.

Plunger misalignment in most of these prior automatic lubricators creates still another sealing problem. Usually the plunger is additionally guided by a central projection to minimize plunger tilting. In all of these prior designs, however, the axial distance between the plunger seal and point of engagement of the central projection varies as the plunger moves or travels in the cup and as the plunger approaches the forward end of the cup, this distance is at a minimum permitting maximum tilting of the plunger at the point in plunger travel where sealing is the most difficult.

The rate of flow of lubricant from the assembly is controlled by the force applied to the piston or plunger by the coil compression spring, and if the flow rate is too high or too low, the maintenance operator simply changes the lubricator spring from one spring rate to another. To do this, in all presently known automatic lubricators, it is necessary to disconnect the cupshaped reservoir from the base, clean the grease from inside the reservoir, remove the greasy plunger, then remove and change springs in the bottom of the cup and then reinsert the piston in the cup and replace the cup. This is a messy and time consuming operation.

In one of the recently devised modifications to the basic automatic lubricator, the base as well as a transparent cup or reservoir are plastic and to increase strength a metal outlet fitting is pressed into the plastic base so that it is rigidified and may be easily attached to an associated machinery threaded receiving bore. A metal inlet fitting is pressed into the side of the plastic base and permits lubricant to be added to the lubricator from conventional lubricant supply valves or "grease guns". The problem in these plastic based lubricator designs is that the operator can easily apply too much transverse force to the inlet fitting during the filling operation and the cantilevered plastic base frequently breaks or cracks, destroying the entire lubricator.

It is the primary object of the present invention to ameliorate the problems noted above in automatic lurication devices.

SUMMARY OF THE PRESENT INVENTION

According to the present invention, an automatic lubrication assembly, commonly referred to as an "automatic grease cup", is provided constructed mostly of plastic, that permits the plunger biasing spring to be changed without removing the grease cup, that has a one-piece entirely plastic plunger that requires no separate seals whatsoever, that has a one-piece integral plastic lubrication reservoir and base that is vastly stronger than presently known plastic based lubricators, and that activates a brightly colored spot in the end of the cup when the reservoir is at its full mark.

Towards these ends, the present lubricator includes an integral one-piece molded plastic base and open reservoir cup with an insert molded metal outlet fitting and an easily removable plastic end cap for the open end of the cup. A one-piece plastic plunger is slidable in the cup and has a flexible integral forwardly and outwardly directed lip that seals against the interior wall of the cup assisted by the force of hydraulic pressure on the forward side of the plunger. The plunger has a forwardly extending stem projecting within the elongated metal outlet fitting that carries a guide to maintain the plunger aligned at all times. The plunger is biased forwardly by a coil compression spring reacting against the end cap, and the rear side of the plunger carries a foam disc that provides the visual indication spot when it engages the inside of the "contact clear" cap in its rearmost position when the lubricator is filled.

The integral base and cup is constructed of a durable transparent plastic such as polysulfone, and the interior of the cup is cored by conventionally known plastic molding techniques, and the core draft angle on the cup interior provides a decreasing cup inside diameter from the open end forwardly which is the reverse of present lubricators. This results in the plunger sealing being tighter and better at the forward end of its stroke where sealing is the most difficult.

The insert molded outlet fitting is an elongated steel tubular member molded in an elongated annular plastic boss in the base that projects rearwardly a substantial distance into the reservoir cup itself. Because of the length of the outlet fitting and its surrounding plastic boss in the base, and the fact that it extends a substantial distance rearwardly from the transversely positioned inlet fitting in the base, it acts as a "backbone" for the integral base and cup and resists any side loading imposed on the inlet fitting by the operator during the filling operation.

The outlet fitting also has a central elongated guide bore in which the plunger stem guide slides, and the guide engages throughout the plunger stroke, and the axial distance between the point of contact of the guide in the guide bore and a transverse plane containing the plunger seal lip remains constant as the plunger moves assuring plunger alignment at all times. Thus, the outlet fitting performs the two-fold function of rigidifying the integral cup and base and assuring uniform plunger guiding throughout its stroke.

The one-piece molded plunger and stem is constructed of a rigid injection moldable plastic such as polypropylene. The term "rigid" plastic as defined herein with respect to this plunger is a plastic or plastic-like material having a Shore A durometer above 85. An important aspect of the present invention is that while the plunger is constructed of a rigid plastic, it has a forwardly and outwardly directed annular sealing lip that is sufficiently thin, approximately 0.022 inches, so that it is flexible. The outer diameter of the sealing lip is greater than the inside diameter of the cup by some 0.020 inches so that the lip is compressed when the plunger is inserted into the cup. The forwardly and outwardly directed configuration of this lip enables hydraulic pressure in the forward face of the plunger to assist in forcing the lip outwardly against the interior wall of the cup to improve sealing.

The plunger has a double reverse bellows shape when viewed in cross-section to reduce the axial length of the entire assembly. A first inner bellows on the plunger defines a deep annular recess that fits over the outlet fitting in the forward position of the plunger, and an outer reverse bellows forms a deep annular recess on the rear side of the piston that forms a seat for the coil compression spring.

There is a short axially extending overflow slot in the interior wall of the cup adjacent its open end. When the plunger moves to the end of the cup during the filling operation, and if the operator inadvertently attempts to overfill the cup, the plunger sealing lip will uncover the leading edge of the overflow slot providing communication between the cup interior and the atmosphere permitting lubrication flow from the assembly. The overflow slot is easily formed by the core of the cup and thus requires no special machining as in prior known lubrication overflow devices.

The removable end cap for the cup is constructed of a translucent plastic such as nylon and carries a plurality of bayonet connectors about its periphery that lock on cooperating connectors formed integrally on the periphery of the cup. The plunger biasing spring, in addition to performing its normal plunger biasing function, also provides the axial locking force against the cap for the bayonet connectors. The plunger biasing spring may be easily changed in this assembly by removing the cap and changing the spring and replacing the cap without requiring the removal of any greasy parts as in prior known designs.

The visible "cup full" spot described above is effected by a vinyl foam disc on the rear side of the plunger wetted by a small amount of grease that engages the inside of the translucent or "contact clear" cap in the rearmost position of the plunger, providing a brightly colored spot when the grease level in the cup has reached its full mark.

DETAILED DESCRIPTION OF THE PREFERRED EMBODIMENT

Figure 1:
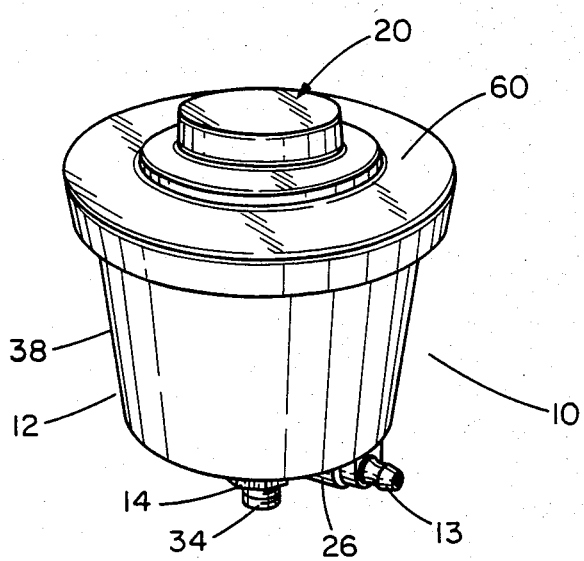
FIG. 1 is a perspective view of an automatic lubrication assembly according to the present invention.
Figure 2:
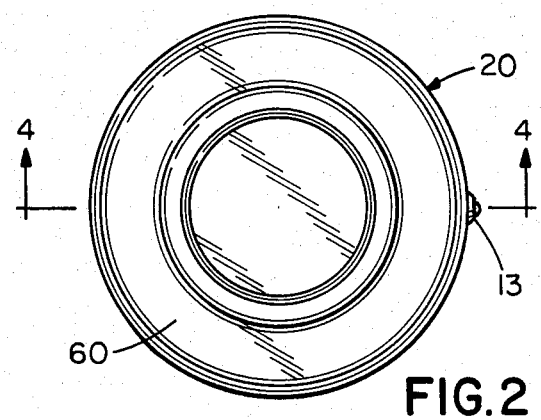
FIG. 2 is a top view of the lubrication assembly illustrated in FIG. 1.
Figure 3:
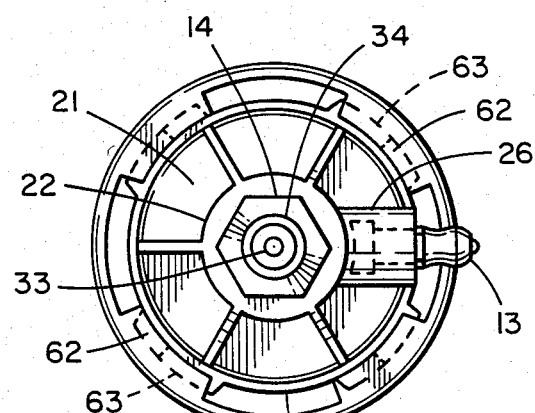
FIG. 3 is a bottom view of the lubrication assembly illustrated in FIG. 1.

Referring to the drawings and particularly to FIGS. 1 to 4, an automatic lubrication assembly 10 is illustrated consisting generally of a one-piece clear plastic integral base and cup 12 with an inlet fitting 13 and an insert molded outlet fitting 14, a one-piece plastic plunger and stem 16 slidable in the cup biased by a coil compression spring 18, and a removable translucent plastic closure cap 20.

The one-piece plastic base and cup member 12 is generally cup-shaped in configuration and constructed of a clear plastic such as clear polysulfone that permits the visual inspection of the lubrication level within the reservoir defined by the interior of the cup. Base and cup member 12 generally includes a bottom wall 21 with a projecting annular wall 38.

The bottom wall 21 has a forwardly projecting annular boss 22 and a rearwardly projecting annular boss 23 surrounding and engaging the outlet fitting 14. The interior of the bottom wall 21 is depressed at 25 forming a radial semi-annular projection 26 with a radial bore 27 into which the metal inlet fitting 13 is pressed by conventional plastic insertion techniques. Lubricant supplied to the inlet fitting 13 from a conventional lubrication source flows through depression 25 into cup reservoir 30 forcing plunger and stem 16 rearwardly in the cup.

The outlet fitting 14 is an elongated tubular steel member that is insert molded in the cup and base 12 and serves to rigidify cup and base 12 and also to guide the piston and stem 16 throughout its length of movement. The outlet fitting 14 has an enlarged central bore portion 31 that guides the piston and also acts as a flow passage for lubricant passing through the outlet fitting, and it communicates with a reduced bore portion 33 that forms the outlet orifice for the lubricator. Outlet fitting 14 has a reduced threaded end 34 for attaching the lubricator to the machine to be lubricated.

Figure 4:
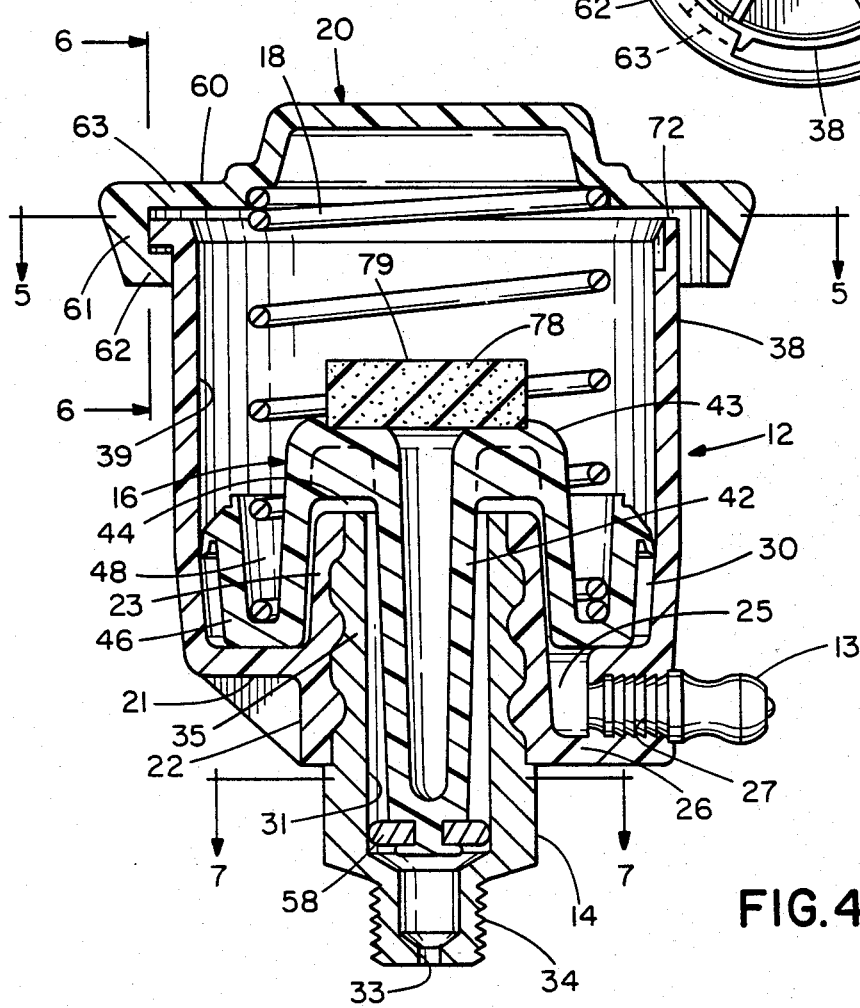
FIG. 4 is an enlarged longitudinal section taken generally along line 4—4 of FIG. 2.

As seen clearly in FIG. 4, the outlet fitting 14 has an elongated tubular body portion 35 in contiguous engagement with bosses 22 and 23 and it has an axial length almost half the length of the integral base and cup member 12. Also, the fitting portion 35 extends upwardly into cup reservoir 30 over thirty percent of the axial length of the cup and substantially rearwardly of the axial position of the inlet fitting 13, which is actually positioned below the bottom wall 21 of the cup, and these relationships provide increased strength for the cup and base member 12 against transverse or radial loading applied by the operator to the inlet fitting 13 during the filling operation.

The annular wall 38 forms the cup and reservoir portion of the base and cup member 12. Interior surface 39 of wall 38 is formed by a core that produces a draft angle of several degrees on wall 39. This draft angle provides slightly decreasing diameters in the cup moving forwardly from the open end toward the bottom wall 21. This reverse draft angle produces tighter piston sealing when the plunger is near its forward position illustrated in FIG. 4, where normally sealing is difficult because spring force and lubricant pressure at at a minimum in this position.

The plunger and guide 16 is a one-piece rigid plastic molding constructed of an injection moldable plastic such as polypropylene, although other plastics may be found suitable as well. Plunger 16 is rigid in the sense that it has a Shore A durometer above 85, and preferably about 90. As seen in FIG. 4, the plunger 16 includes a central forwardly extending slightly tapered guide portion 42 extending from a first inner bellows portion 43 that defines a deep forwardly extending recess 44 to receive and accommodate the base boss 23 and outlet fitting portion 35 when the piston is in its forward most position. An outer reverse bellows 46 is connected to bellows 43 and forms a deep rearwardly opening annular recess 4 that receives and forms a spring seat for coil compression spring 18.

Figure 9:
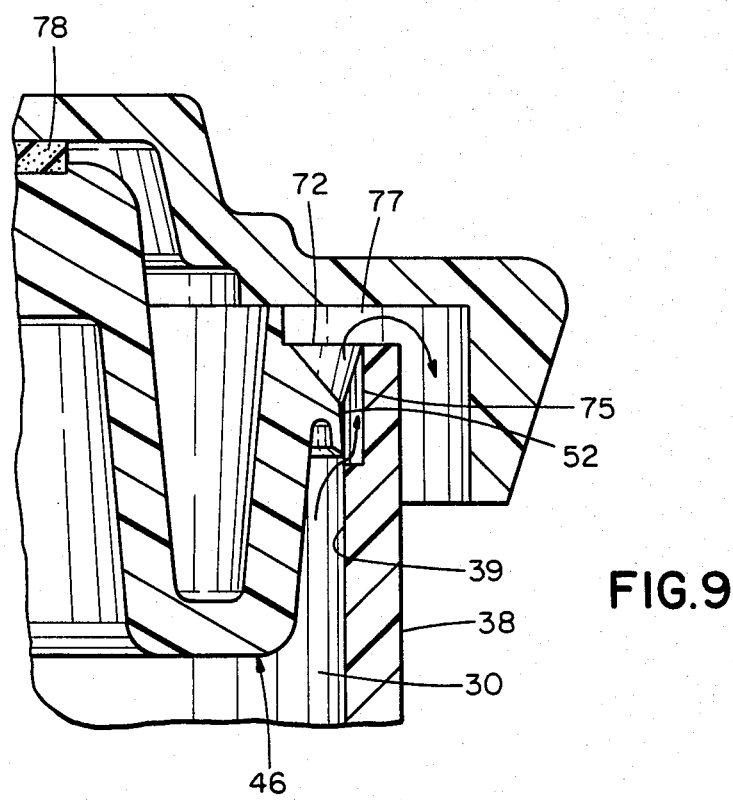
FIG. 9 is an enlarged fragmentary section showing the plunger lip compressed in the lubrication cup.
Figure 10:
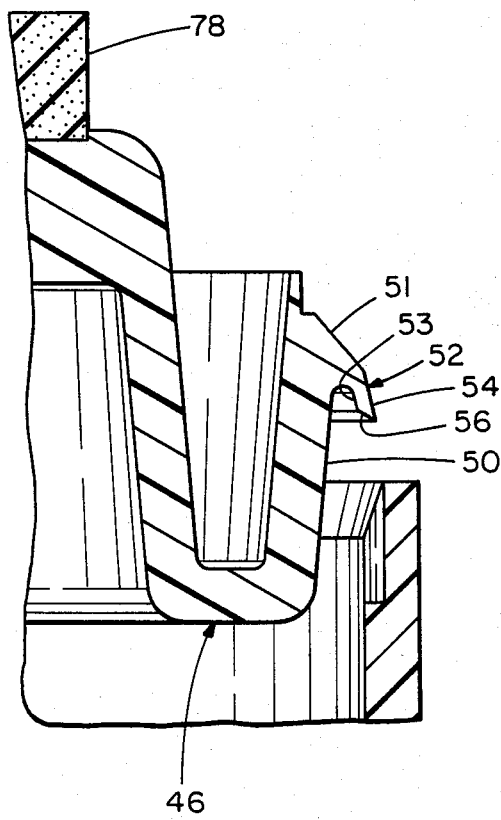
FIG. 10 is an exploded fragmentary section illustrating the plunger sealing lip in its relaxed position relative to the cup interior wall.

Bellows 46, as seen more clearly in FIGS. 9 and 10, has a rearwardly and outwardly extending rigid frusto-conical wall 50 having a fowardly and outwardly extending lip support portion 51 extending therefrom. A forwardly and outwardly extending lip 52 projects from the support portion 51 and is defined by parallel frusto-conical side walls 53 and 54 connected by an inclined forward wall 56. The side walls 53 and 54 are sufficiently close together, on the order of 0.020 inches, so that the lip 52 is flexible and is compressed radially inwardly when the plunger is inserted into the cup 38, as seen in FIG. 9. The extreme outer diameter of the lip 52 in its relaxed position, as seen in FIG. 10, is some 0.020 inches larger than the largest diameter (near the open end) of the inside of the cup. This eliminates the need for any separate seals for the plunger. Fluid pressure in the reservoir 30 acts on lip walls 53 and 56 to assist in sealing the lip 52 against inner wall 39.

Figure 7:
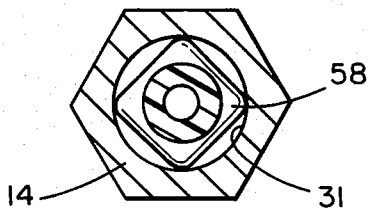
FIG. 7 is a fragmentary section illustrating the plunger guide in the outlet fitting guide bore, taken generally along line 7—7 of FIG. 4.

Plunger guide stem 42 has a brass guide 58 staked to its forward end and it is generally rectangular in configuration, as seen in FIG. 7, to permit the free flow of lubricant through the guide bore 31 while at the same time maintaining sliding contact with the bore at all times. The bore 31 has a sufficient length so that guide 58 engages the bore throughout the length of stroke of the plunger and this maintains the transverse plane of the plunger lip 52 completely perpendicular to the axis of the lubricator in all positions of the plunger so that there is no cocking or tilting of the plunger 16 at any time.

The open end of the base and cup 12 is closed by the removable cap 20 which is constructed of a translucent plastic, sometimes referred to as "contact clear" plastic. Nylon has been found suitable for cap 20 but other translucent plastic materials may work as well. Cap 20 has a shallow cup-shaped configuration with a bottom wall 60 and an annular side wall 61 with four bayonet connector projections 62 extending radially inwardly that cooperate with and lock against four bayonet connector projections 63 extending radially outwardly from the periphery of cup wall 38. Cover 20 has a central circular recess 80 that receives the plunger bellows 43 to reduce the overall length of the cup and base member 12 for a given effective reservoir capacity.

Figure 5:
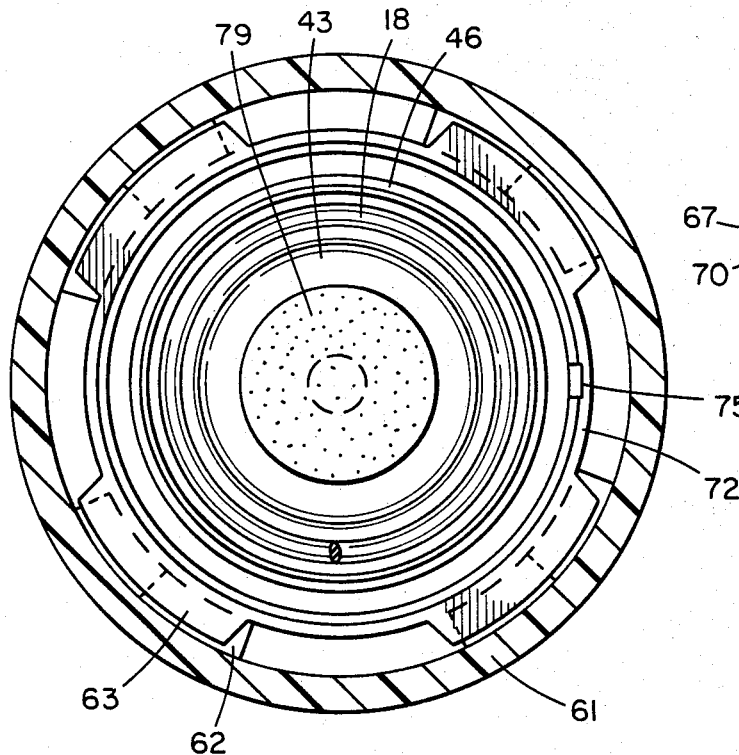
FIG. 5 is a cross-section taken generally along line 5—5 of FIG. 4 illustrating the bayonet connectors between the cap and the cup.
Figure 6:
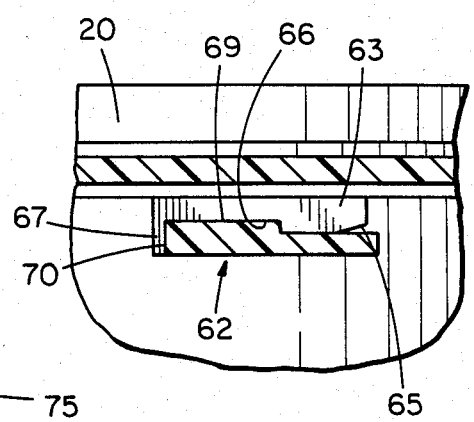
FIG. 6 is a fragmentary section taken generally along line 6—6 of FIG. 4 illustrating one of the bayonet connectors from its side.

As seen more clearly in FIGS. 5 and 6, the cup projections 63 each have a forward (rotationally) camming surface 65, a locking recess 66 and a stop shoulder 67. Each of the cap projections 62 has a locking tab 69 corresponding in length to the locking recess 66 so that it fits and locks in the recess, and a stop shoulder 70 that abuts against stop shoulder 67 when the cap is in its locked position. The bayonet projections 62 and 63 are illustrated in their locked position in FIGS. 5 and 6. To release the connectors, the cap 20 is depressed against the biasing force of the compression spring 62 freeing projection 69 from recess 66, and then rotated counterclockwise moving projection 62 to the right of projection 63 as viewed in FIG. 6. Once the projections 62 are circumferentially clear of projections 63 cap 20 may be removed.

To replace cap 20, the cap is pressed against spring 18 and the cap is moved forwardly until bottom wall 60 engages cup rear wall 72 with the projections 62 between the projections 63. Then the cap is rotated clockwise engaging projection shoulders 70 with camming surfaces 65 which serves to pull the projections 62 axially forwardly under the projections 63 until the rotational position is reached where the locking projections 69 are aligned with the locking recesses 66 and the stop shoulders 70 engage the stop shoulders 67 at which time spring 18 will snap the locking projections 69 into the recesses 66, locking the entire cap against movement, either rotationally or axially.

Figure 8:
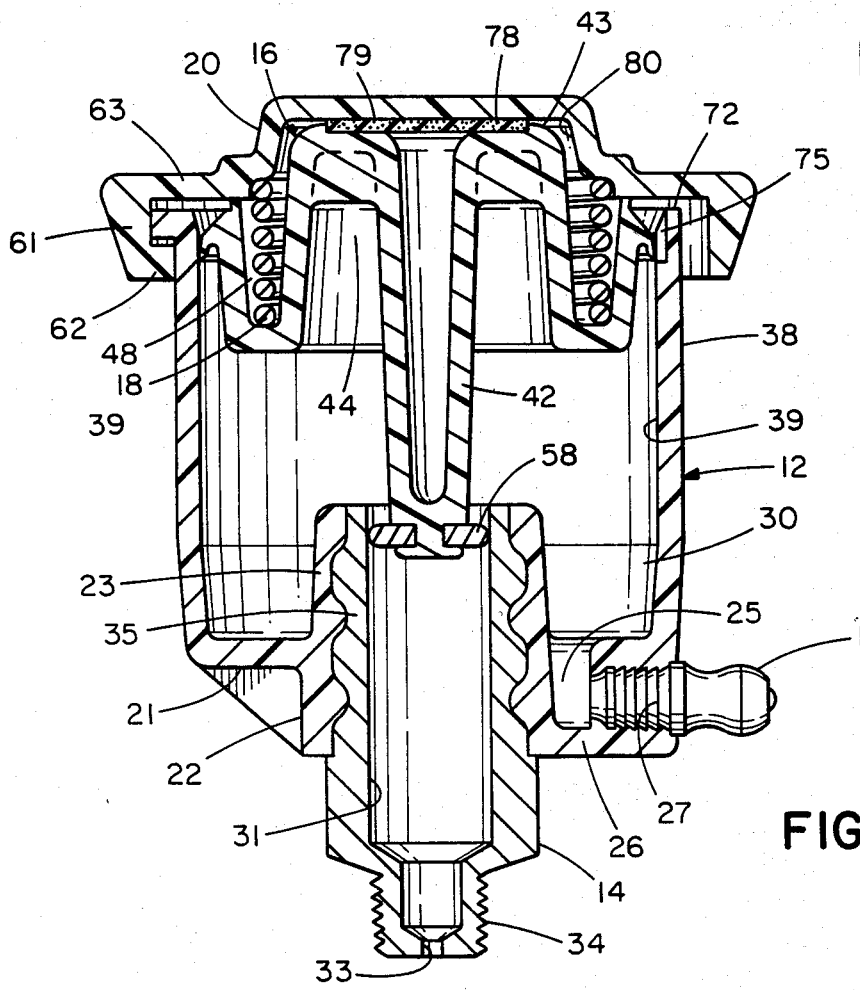
FIG. 8 is a longitudinal section similar to FIG. 4 with the plunger in its rear-most position when the cup is full of lubricant.

As seen clearly in FIGS. 5, 8 and 9, an overflow slot 75 is provided in cup wall 39 adjacent the open end of the cup. Slot 75 is formed by the same core that forms the cup interior and hence it requires no special machining. The slot 75 is positioned so that the plunger seal lip opens the slot to the reservoir when the plunger is in its its rear-most position shown in FIG. 9 permitting grease to pass out of the reservoir in the direction of the arrows indicated in FIG. 9 through slot 75, and exit the cup through a clearance 77 between the rear wall 72 of the cup and the cap 20.

Figure 11:
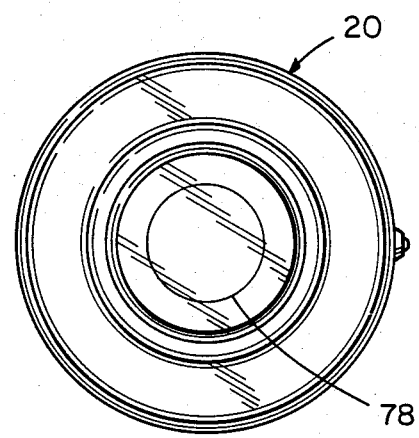
FIG. 11 is a top view of the assembly similar to FIG. 2 illustrating the visual spot in the cup closure cap when the plunger is in its rear position illustrated in FIG. 8.

Automatic lubrication assembly 10 also provides a visual "spot" indicator to tell the operator when the reservoir has reached its full mark during lubricant filling. Toward this end, the plunger 16 carries a vinyl foam disc 78 with a plastic red colored film 79 bonded to its upper surface that is wetted with a small amount of lubricant to improve its visibility. When the plunger 16 reaches its end of rear stroke position illustrated in FIG. 8 during the filling operation, disc 78 compresses against the inside of the translucent "contact clear" cover 20, providing a visible indication or spot illustrated in FIG. 11 on the top of the cover, plainly visible to the operator telling him that the grease level in the reservoir has reached its full mark.

I claim:

1. An automatic lubrication assembly, comprising; base means with an outlet opening adapted to be connected to the machine to be lubricated, cup means extending from the base means adapted to receive lubricant, an inlet fitting communicating with the interior of the cup means, and a one-piece plastic spring biased plunger slidable in the cup means and urged in a direction to dispense lubricant in the cup means through the outlet opening in the base means, said plunger having integral seal means including a rigid annular plastic support portion adjacent but spaced from the interior wall of the cup means, said seal means including an integral plastic annular lip extending radially outwardly and forwardly from the rigid support portion, said annular lip being sufficiently thin so that it flexes against the interior wall of the cup means, said annular lip having a relaxed outer diameter greater than the inside diameter of the cup means.

2. An automatic lubrication assembly, as defined in claim 1, wherein the plunger annular support portion and the integral lip are constructed of a plastic having a Shore A durometer above 85.

3. An automatic lubrication assembly, as defined in claim 1, wherein the base means has an axially extending guide bore communicating with the outlet opening therein, said plunger having a guide stem connected thereto that extends forwardly into the base means guide bore, and a guide member on the end of the guide stem slidably enagageable with the guide bore throughout its range of movement to maintain the plunger and its seal lip in accurate alignment throughout movement of the plunger.

4. An automatic lubrication assembly, as defined in claim 3, wherein the plunger and the guide stem are a one-piece plastic molding.

5. An automatic lubrication assembly, comprising; base means with an outlet opening adapted to be connected to the machine to be lubricated, cup means extending from the base means adapted to receive lubricant, an inlet fitting communicating with the interior of the cup means, and a spring biased plunger slidable in the cup means and urged in a direction to dispense lubricant in the cup means through the outlet opening in the base means, said plunger having integral seal means including a rigid annular plastic support portion adjacent but spaced from the interior wall of the cup means, said seal means including an integral plastic annular lip extending radially outwardly and forwardly from the rigid support portion, said annular lip being sufficiently thin so that it flexes against the interior wall of the cup means, said base means having an axially extending guide bore communicating with the outlet opening therein, said plunger having a guide stem connected thereto that extends forwardly into the base mans guide bore, and a guide member on the end of the guide stem slidably engageable with the guide bore throughout its range of movement to maintain the plunger and its seal lip in accurate alignment throughout movement of the plunger, said plunger and the guide stem are a one-piece plastic molding, said plunger having a rearwardly extending annular recess in the forward side thereof, said base means having a rearwardly extending annular boss defining at least in part the guide bore, said boss being receivable in the plunger recess to reduce the axial length of the assembly and to increase the lubricant capacity of the assembly.

6. An automatic lubrication assembly, comprising; base means with an outlet opening adapted to be connected to the machine to be lubricated, cup means extending from the base means adapted to receive lubricant, an inlet fitting communicating with the interior of the cup means, a spring biased plunger slidable in the cup means and urged in a direction to dispense lubricant in the cup means through the outlet opening in the base means, said cup means having translucent cover means on the rear end thereof, and a colored marker on the rear surface of the plunger adapted to engage the translucent cover means in the extreme rear portion of the plunger to provide a visual indication to the operator that the assembly is completely full of lubricant.

7. An automatic lubrication assembly, as defined in claim 6, wherein the plunger has a forwardly extending annular recess in its rear surface, a coil compression spring in the recess and resting against the cover means to permit the marker to engage the cover means in the normal range of movement of the plunger.

8. An automatic lubrication assembly, as defined in claim 6, wherein the marker is constructed of plastic foam and carries a wetting agent to increase the visibility of the marker upon contact with the translucent cover means.

9. An automatic lubrication assembly, comprising; base means with an outlet opening adapted to be connected to the machine to be lubricated, cup means extending from the base means adapted to receive lubricant, an inlet fitting communicating with the interior of the cup means, and a spring biased plunger slidable in the cup means and urged in a direction to dispense lubricant in the cup means through the outlet opening in the base means, said base means being constructed of plastic and including an annular portion with an elongated tubular metal outlet member insert molded therein, a metal inlet fitting in the base means extending generally transversely to the metal outlet member, said metal outlet member extending rearwardly a substantial distance from the transverse plane of the inlet fitting so that side loads on the plastic portion of the base means, caused by an associated lubricant filling device during filling of the cup means, are transferred to and easily absorbed by the elongated metal outlet member.

10. An automatic lubrication assembly, as defined in claim 9, wherein the metal outlet member has a guide bore therein communicating with the outlet opening, said plunger having a guide stem thereon extending forwardly and axially into the guide bore, and a guide on the end of the guide stem slidably engageable with the guide bore throughout the range of movement of the plunger to maintain the plunger aligned at all times in the cup means.

11. An automatic lubrication assembly comprising; an one-piece plastic base and lubricant reservoir cup, an outlet fitting connected to the base constructed of metal and having an outlet opening communicating with the reservoir cup and adapted to be connected to the machine to be lubricated, said cup having an open rear end, a plunger slidable in the cup, a spring biasing the plunger in a direction to dispense lubricant in the reservoir cup through the outlet fitting, and an easily removable cap over the open end of the reservoir cup against which one end of the spring reacts, whereby the spring may be changed to vary the flow of lubricant by removing the cap without contacting lubricant in the reservoir cup, a clearance between the removable cap and the cup communicating with the exterior of the assembly, and axially extending recess means in the interior of the cup adjacent the open end adapted to carry overflow lubricant from the cup to the clearance when the piston reaches its extreme rearward position to prevent overfilling the reservoir cup.

12. An automatic lubrication assembly, comprising; a one-piece plastic base and lubricant reservoir cup, an outlet fitting connected to the base constructed of metal and having an outlet opening communicating with the reservoir cup and adapted to be connected to the machine to be lubricated, said cup having an open rear end, a plunger slidable in the cup, a spring biasing the plunger in direction to dispense lubricant in the reservoir cap through the outlet fitting, an easily removable translucent cap over the open end of the reservoir cup against which one end of the spring reacts, whereby the spring may be changed to vary flow of lubricant by removing the cap without removing lubricant from the reservoir cup, and a colored marker on the rear surface of the plunger adapted to engage the translucent cap in the extreme rear position thereof to provide a visual indication to the operator that the assembly is completely full of lubricant.

13. An automatic lubrication assembly, comprising; a one-piece plastic base and lubricant reservoir cup, an outlet fitting connected to the base constructed of metal and having an outlet opening communicating with the reservoir cup and adapted to be connected to the machine to be lubricated, said cup having an open rear end, a plunger slidable in the cup, a spring biasing the plunger in a direction to dispense lubricant in the reservoir cup through the outlet fitting, an easily removable cap over the open end of the reservoir cup against which one end of the spring reacts, whereby the spring may be changed to vary flow of lubricant by removing the cap without removing lubricant from the reservoir cup, said base being constructed of plastic and including an annular portion with an elongated tubular metal outlet member insert molded therein, and a metal inlet fitting in the base extending generally transversely to the metal outlet member, said metal outlet member extending rearwardly a substantial distance from the transverse plane of the inlet fitting so that side loads on the base, caused by an associated lubricant filling device during filling of the cup, are transmitted to and easily absorbed by the elongated metal outlet member.

14. An automatic lubrication assembly, comprising; base means with an outlet opening adapted to be connected to the machine to be lubricated, cup means extending from the base means adapted to receive lubricant, an inlet fitting communicating with the interior of the cup means, a one-piece plastic spring biased plunger slidable in the cup means and urged in a direction to dispense lubricant in the cup means through the outlet opening in the base means, said plunger including integral seal means including a rigid annular support portion adjacent but spaced from the interior wall of the cup means, said seal means including an integral plastic annular lip extending radially outwardly and forwardly from the rigid support portion, said annular lip being sufficiently thin so that it flexes against the interior wall of the cup means, said base means having an elongated axially extending guide bore therein communicating with the outlet opening, said plunger having a guide stem extending forwardly therefrom into the guide bore in the base means, and said guide stem having a guide on the forward end thereof slidably engagable with the guide bore in the base means throughout its range of movement so that the plunger always remains aligned in the cup means without any tilting or twisting.

15. An automatic lubrication assembly, comprising; base means with an outlet opening adapted to be connected to the machine to be lubricated, cup means extending from the base means adapted to receive lubricant, an inlet fitting communicating with the interior of the cup means, a spring biased plunger slidable in the cup means and urged in a direction to dispense lubricant in the cup means through the outlet opening in the base means, seal means surrounding the plunger including a rigid annular plastic support portion surrounding and connected to the plunger adjacent but spaced from the interior wall of the cup means, and an integral plastic annular lip extending outwardly and forwardly from the rigid support portion, said annular lip being sufficiently thin so that it flexes against the interior wall of the cup means, said cup means having translucent cover means in the extreme rear position of the plunger to provide a visual indication to the operator that the assembly is completely full of lubricant.

16. An automatic lubrication assembly, comprising; base means with an outlet opening adapted to be connected to the machine to be lubricated, cup means extending from the base means adapted to receive lubricant, an inlet fitting communicating with the interior of the cup means, a spring biased plunger slidable in the cup means and urged in a direction to dispense lubricant in the cup means through the outlet opening in the base means, seal means surrounding the plunger including a rigid annular plastic support portion surrounding and connected to the plunger adjacent but spaced from the interior wall of the cup means, an integral plastic annular lip extending outwardly and forwardly from the rigid support portion, said annular lip being sufficiently thin so that it flexes against the interior wall of the cup means, said base means being plastic and including an annular portion with an elongated tubular metal outlet member insert molded therein, and a metal inlet fitting in the base means extending generally transversely to the metal outlet member, said metal outlet member extending rearwardly a substantial distance from the transverse plane of the inlet fitting so that side loads on the plastic portion of the base means are transferred to and easily absorbed by the elongated metal outlet member.

17. An automatic lubrication assembly, comprising; base means with an outlet opening adapted to be connected to the machine to be lubricated, cup means extending from the base means adapted to receive lubricant, an inlet fitting communicating with the interior of the cup means, a spring biased plunger slidable in the cup means and urged in a direction to dispense lubricant in the cup means through the outlet opening in the base means, said base means having an elongated axially extending guide bore therein communicating with the outlet opening, said plunger having a guide stem extending forwardly therefrom into the guide bore, said guide stem extending forwardly therefrom into the guide bore, said guide stem having a guide on the end thereof engageable with the guide bore throughout its range of movement so that the plunger always remains aligned in the cup means without any tilting or twisting, said cup means having translucent cover means on the rear end thereof, and a marker on the rear surface of the plunger adapted to engage the translucent cover means in the extreme rear position of the plunger to provide a visual indication to the operator that the assembly is completely full of lubricant.

18. An automatic lubrication assembly, comprising; base means with an outlet opening adapted to be connected to the machine to be lubricated, cup means extending from the base means adapted to receive lubricant, an inlet fitting communicating with the interior of the cup means, a spring biased plunger slidable in the cup means and urged in a direction to dispense lubricant in the cup means through the outlet opening in the base means, said cup means having translucent cover means on the rear end thereof, a colored marker on the rear surface of the plunger adapted to engage the translucent cover means in the extreme rear position of the plunger to provide a visual indication to the operator that the assembly is completely full of lubricant, said base means being plastic and including an annular portion with an elongated tubular metal outlet member insert molded therein, and a metal inlet fitting in the base means extending generally transversely to the metal outlet member, said metal outlet member extending rearwardly a substantial distance from the transverse plane of the inlet fitting so that the side loads on the plastic portion of the base means are transferred to and easily absorbed by the elongated metal member.

* * * * *

UNITED STATES PATENT AND TRADEMARK OFFICE
CERTIFICATE OF CORRECTION

PATENT NO. : 4,496,030
DATED : Jan. 29, 1985
INVENTOR(S) : John A. Gloviak

It is certified that error appears in the above-identified patent and that said Letters Patent is hereby corrected as shown below:

Claim 11, line 25, cancel "piston" insert--plunger--.

Claim 15, line 41, after "means" insert--on the rear end thereof, and a marker on the rear surface of the plunger adapted to engage the translucent cover means----, Claim 17, lines 12 and 13, cancel "said guide stem extending forwardly therefrom into the guide bore,".

Signed and Sealed this

Third Day of September 1985

[SEAL]

Attest:

DONALD J. QUIGG

Attesting Officer     Acting Commissioner of Patents and Trademarks - Designate